United States Patent [19]

Majerus

[11] Patent Number: 4,865,098
[45] Date of Patent: Sep. 12, 1989

[54] PNEUMATIC AIRCAFT TIRE
[75] Inventor: Norbert Majerus, Akron, Ohio
[73] Assignee: The Goodyear Tire & Rubber Company, Akron, Ohio
[21] Appl. No.: 685,228
[22] Filed: Dec. 27, 1984

Related U.S. Application Data
[63] Continuation of Ser. No. 465,216, Feb. 9, 1983, abandoned.

[51] Int. Cl.$^4$ .............................................. B60C 11/04
[52] U.S. Cl. ................................................ 152/209 R
[58] Field of Search .......... 152/209 R, 209 D, 209 A, 152/209 B; D12/136, 139, 141, 144

[56] References Cited

U.S. PATENT DOCUMENTS

| | | | |
|---|---|---|---|
| D. 63,317 | 11/1923 | Pharis | D12/140 |
| D. 63,347 | 11/1923 | Worth | D12/140 |
| D. 77,104 | 12/1928 | Kovacs | D12/139 |
| 2,339,540 | 1/1944 | Roberts | 152/209 R |
| 2,779,378 | 1/1957 | Robertson | 152/209 R |
| 2,972,368 | 2/1961 | Williams | 152/209 R |
| 3,938,572 | 2/1976 | Nishi et al. | 152/209 R |
| 4,057,089 | 11/1977 | Johannsen | 152/209 R |
| 4,178,199 | 12/1979 | Lippman et al. | 152/209 R |
| 4,424,844 | 1/1984 | Fontaine | 152/209 R |

OTHER PUBLICATIONS

U.S. Rubber Co., Airplane treads (Ad) in "Automotive and Aviation Industries", p. 68, Nov. 1943.

*Primary Examiner*—Michael W. Ball
*Attorney, Agent, or Firm*—L. R. Drayer

[57] ABSTRACT

A pneumatic aircraft tire having a ground engaging tread portion provided with a plurality of axially extending grooves disposed in each of the lateral portions thereof. The axial grooves in each lateral portion are spaced apart so as to provide a circumferentially continuous rib therebetween having an axial width of at least 40% of the tread width of said tread portion.

7 Claims, 5 Drawing Sheets

PNEUMATIC AIRCAFT TIRE

This is a Continuation, of application Ser. No. 465,216 filed Feb. 9, 1983, now abandoned.

The foregoing abstract is not to be taken as limiting the invention of this application, and in order to understand the full nature and extent of the technical disclosure of this application, reference must be made to the accompanying drawings and the following detailed description.

The present invention relates to pneumatic tires specifically designed, constructed and intended for use on aircraft. The present invention is particularly useful on high speed aircraft having high landing or take-off speeds.

In the prior art aircraft tires have generally been provided with a plurality of circumferentially closely spaced grooves which were generally spaced apart a distance of about 20% of the tread footprint width. This type of construction was necessary in order to provide acceptable wet traction performance, cooling characteristics and a durable tire construction.

Applicant has discovered a new tire construction which provides highly durable characteristics and improved tread wear while maintaining the wet and dry traction characteristics of the tire.

DETAILED DESCRIPTION OF THE INVENTION

Figure 1:
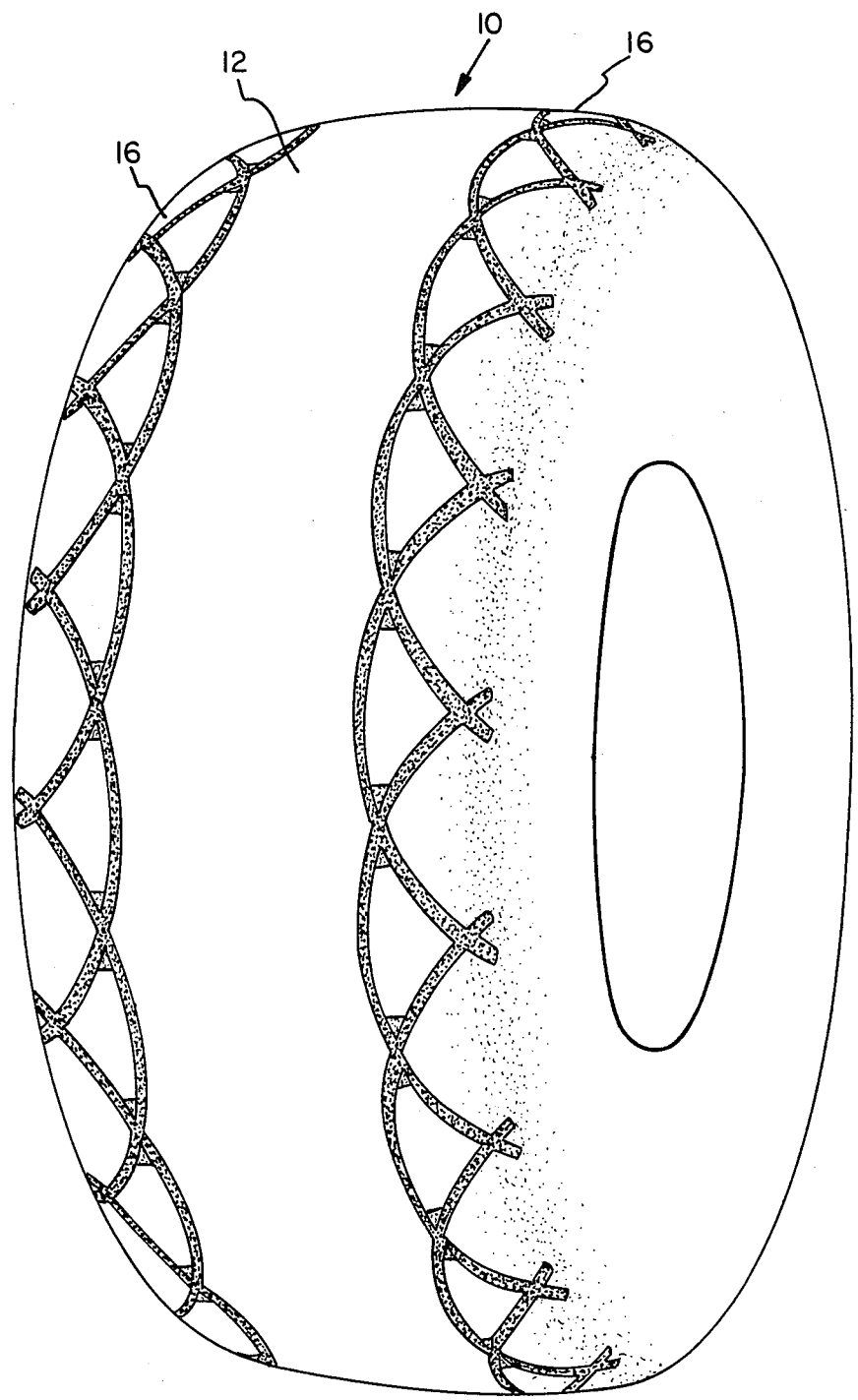
Referring to FIG. 1, there is illustrated a perspective view of a tire constructed in accordance with the present invention.
Figure 2:
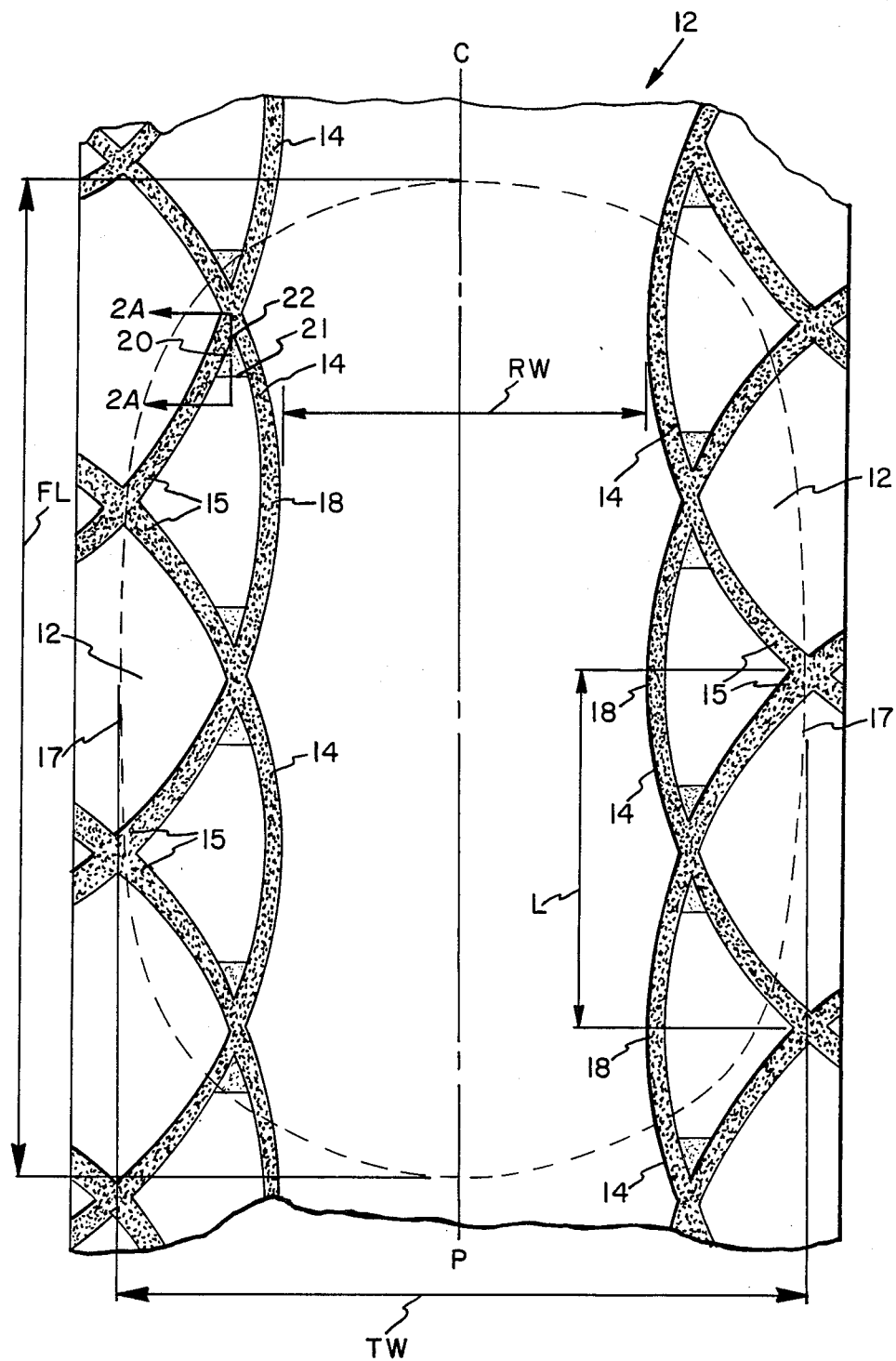
FIG. 2 is an enlarged fragmentary plan view of the tire tread of FIG. 1.

Referring to FIGS. 1 and 2, there is illustrated an aircraft tire made in accordance with the present invention. The tire 10 is provided with a ground-engaging tread portion 12. The dashed line illustrated in FIG. 2 represents the outline configuration of the footprint of the tire as taken from the tire inflated to rated inflation pressure and at rated load. The tread 12 has a tread width TW. For the purposes of this invention, the tread width TW is the maximum axial distance taken from the footprint of the tire at rated inflation and load and measured perpendicular to the mid-circumferential centerplane CP of the tire.

The tread 12 is provided with a plurality of axially extending grooves 14 disposed in the lateral or shoulder region 16 of the tire. The axially inner ends 18 of grooves 14 which are disposed on the opposite side of the mid-circumferential centerplane are disposed axially apart a distance RW of at least 45% of the tread width TW and a distance no greater than 80% of the tread width TW. Preferably, between 55% and 75% of the tread width TW. In the particular embodiment illustrated, the distance RW is approximately 56%. A sufficient number of grooves 14 are provided so that the net to gross of the tread in the footprint area is at least 0.90 and not greater than 0.97 preferably, at least 0.92, most preferably between 0.95 and 0.97. It is preferable to have the net to gross as high as possible to provide increased durability and tread wear. For the purposes of this invention, the net to gross of the tread is defined as the area of ground-engaging tread portion which comes into contact with the ground as divided by the total area of the tread footprint.

Figure 3:
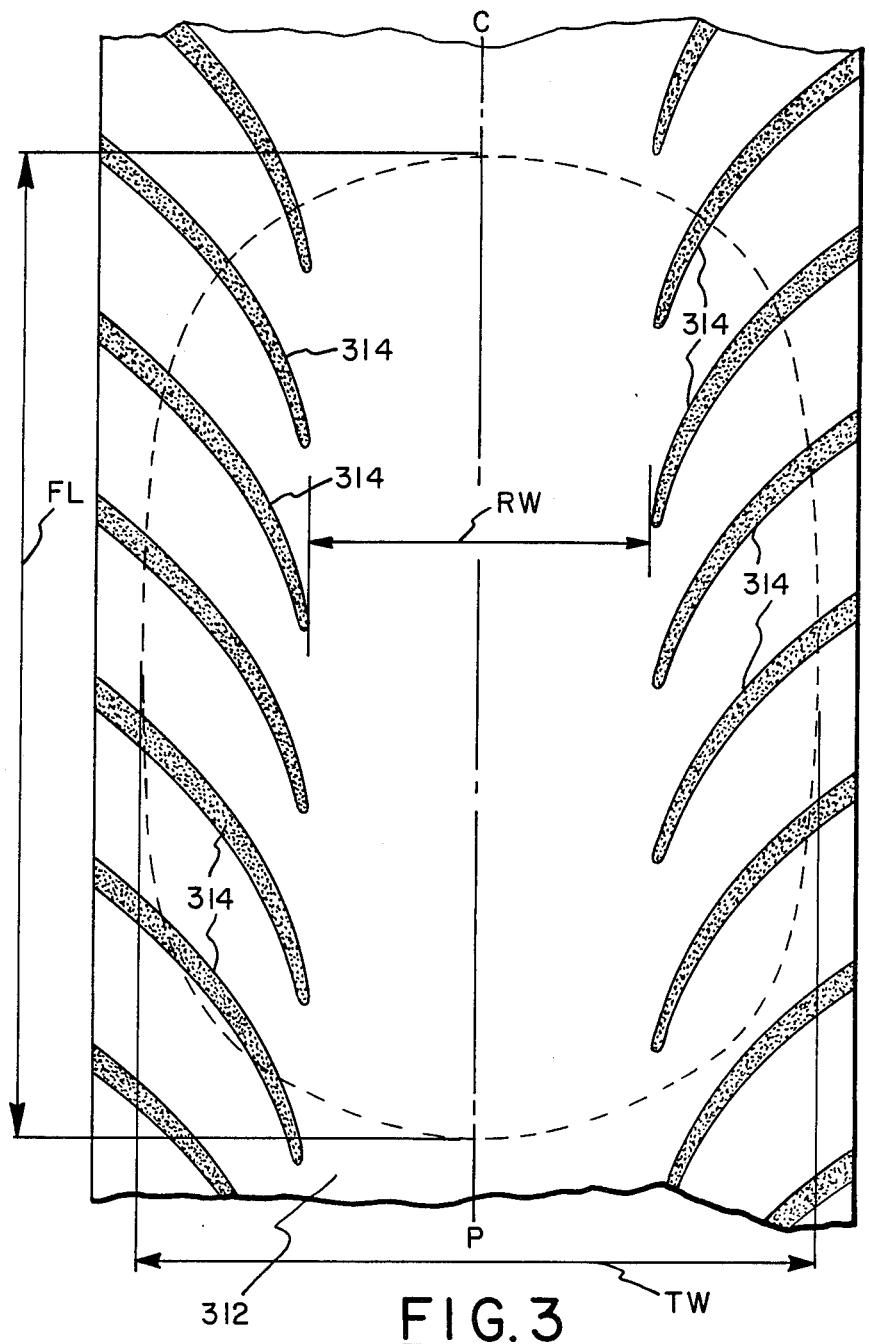
FIG. 3 illustrates an enlarged fragmentary plan view of a tire having a modified tread pattern made in accordance with the present invention.
Figure 4:
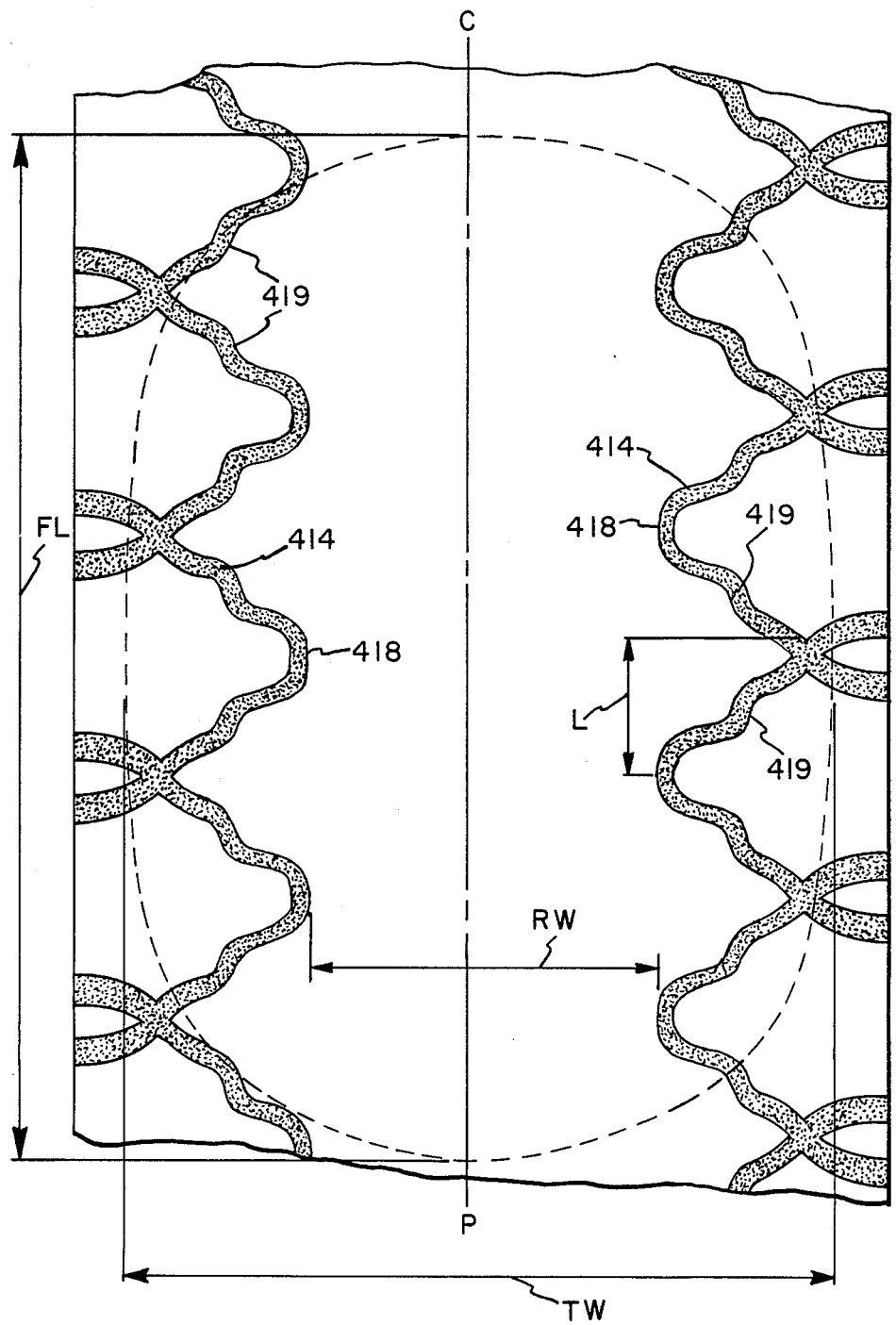
FIG. 4 is an enlarged fragmentary plan view of a tire having yet another modified form of a tread pattern made in accordance with the present invention.

In the particular embodiment illustrated, the grooves 14 at their axially outer ends 15 overlap in a circumferential direction with the next circumferentially adjacent groove 14. In order to minimize hydroplaning and maintain wet and dry traction performance, each groove 14 extends from the axially innermost point 18 axially outward to the tread edge 17 such that the circumferential length L of groove 14 measured from its axially innermost point 18 to its axially outermost point 19 at the tread edge in the footprint is no greater than 100% of the footprint length FL. Preferably, between 25% and 75% of the footprint length FL. In the particular embodiment, L is about 35% of FL. For the purposes of this invention, the footprint length FL is the maximum length of the footprint as measured parallel to the mid-circumferential centerplane CP of the tire. In the particular embodiment illustrated, the grooves 14 are symetrical about their axially innermost point 18 and therefore have a circumferential length of two times L so as to provide a non-directional tire. However, the present invention need not be symetrical but may comprise a plurality of parallel arced grooves for example as is illustrated in FIG. 3. Preferably the grooves 14 extend axially outwardly to the tread edge 17 in a smooth continuous manner as illustrated, increasing in axial orientation as it approaches the tread edge. In the embodiment illustrated, the grooves 14 take a substantial arced or elliptical path from its axially inner point to the tread edge. However, the present invention is not limited to such a structure. The grooves 14 may extend axially outward toward the tread edge in any desired manner, so long as the groove 14 does not have any portion which extends axially inwardly. Referring to FIG. 4, there is illustrated a modified form of the present invention wherein grooves 414 extend from the axially inner end 418 radially outwardly in a substantial S shaped path having a substantially circumferentially extending portion 419 in the center. This center portion 419 does not extend in a direction which would make it come closer to the centerplane CP of the tire. If such a configuration is selected, this substantially straight portion 419 should preferably be no greater than 50% of the circumferential length L of groove 414. Other modifications not illustrated are also contemplated, for example, the grooves may extend at any angle to the mid-circumferential centerplane CP, including at an angle substantially perpendicular to the mid-circumferential centerplane CP. However, as previously stated, the axially extending grooves preferably extend to the tread edge in an arcuate manner.

Figure 2A:
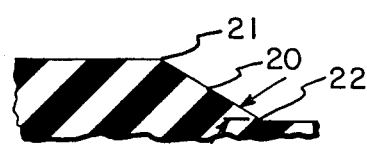
FIG. 2A is a partial cross-sectional view of the tire tread of FIG. 2 taken along line 2A—2A.

As illustrated in FIGS. 1 and 2, the grooves 14 overlap one another to form apexes 20. In such cases where circumferentially adjacent grooves 14 overlap the portion of block formed at the apex is preferably beveled as illustrated in FIG. 2A wherein the apex 20 at point 21 reduces to substantially a zero height at the point 22 where the grooves 14 converge. The vertical angle α formed by this beveled portion 23 should be such so as to avoid sharp confrontation as it enters the footprint. Generally less than about 75%. In the particular embodiment illustrated, the angle α is approximately 45%.

The groove 14 illustrated has a width $W_1$ at its axially inner end 18 which increases to a width of $W_2$ as you approach the tread edge 17. The width $W_2$ of the axially outer end at the tread edge of groove 14 is no greater than three times that of the width $W_1$ at the axially innermost point 18, preferably no greater than two to one. Additionally, the depth of groove 14 at the axially innermost point 18 is greater than the depth in the shoulder portion. Preferably such that the volume in the groove from 18 to the tread edge is substantially constant. Accordingly, the depth of the groove 14 is continuously decreasing as it approaches the tread edge. This type of groove configuration provides for more uniform wear as the tread is used since the axially innermost portion of the tread 12 wears at a faster rate than does the tread at its lateral edge and maintains water channeling passages in the footprint of the tire throughout its entire wear period.

The ground-engaging tread 12 is preferably made of an elastomeric material such that the elastomeric material has a 300% modulus of at least 6 MPa (Mega Pascals), a tensile strength of at least 12 MPa and an elongation of at least 300% as measured by ASTM procedure D412. Additionally, it is desirable that the elastomeric material have a hot rebound of at least 60% as measured per ASTM D1054. Additionally, the dynamic modulus of the elastomeric material is at least 5 MPa (5 Mega Pascals) as measured per ASTM D2231 on Goodyear's vibrotester. Applicant has found for high speed aircraft tires, tires that exceed speed of 180 mph during take off preferably have a tread portion made of an elastomeric material which has:

a 300% modulus of 12 MPa, modulus of 12 MPa tensile strength of 20 MPa,
elongation of at least 500%,
a hot rebound of 75%,
a Goodrich blow out value of 20 minutes,
a Goodrich flex value of 30° C. per 15 minutes,
a dynamic modulus of 7 MPa,
tear resistance of 15 KN/m and
Demattia flex of 10 hrs.

The 300% modulus, tensile strength and elongation being determined by ASTM D412, the hot rebound by ASTM 1054, dynamic modulus by ASTM 2231, Goodrich blow out by ASTM D623A and Demattia flex by ASTM D813.

Applicant has found that a tire made in accordance with the present invention has increased wear capabilities upwards of up to 25% or 30% while at the same time maintaining or improving wet and dry traction characteristics. That is, the tire would be capable of completing an additional 25-30% number of landing cycles. Additionally, it is believed that a tire constructed in accordance with the present invention has improved tread wear on cornering and sharp turns that is required of aircraft during taxiing. In the prior art it was believed that if the grooves in the central portion of the tire were eliminated or reduced, the wear properties of the tire and wet and dry traction performance characteristics of an aircraft tire would be reduced. Applicant has quite unexpectedly found that by providing a wide circumferential rib in the central portion of the tire and axially extending grooves in the lateral region of the tread portion, the wear performance characteristics could be significantly improved while maintaining or improving in some respects the performance handling characteristics such as wet and dry traction.

As previously stated, FIG. 3 illustrates a modified form of the present invention. In FIG. 3 there is provided a plurality of grooves 314. The grooves 314 are similar to grooves 14 except that the grooves extend only in one circumferential direction. The tread 312 of the tire shown in FIG. 3 is identical in all other respects with regard to tire 10 of FIGS. 1 and 2.

Figure 5:
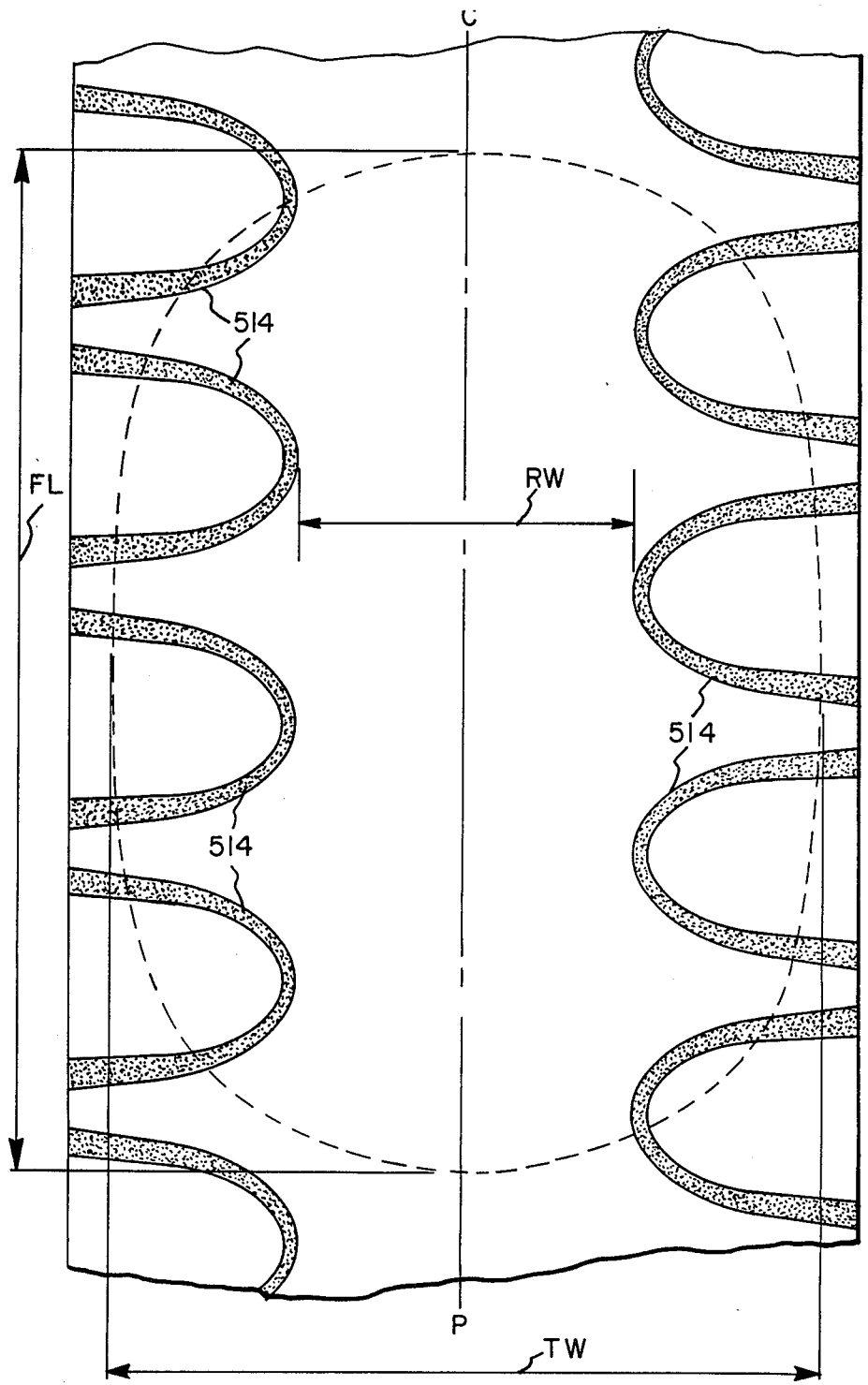
FIG. 5 is an enlarged fragmentary plan view of a tire illustrating yet still another modified tread pattern made in accordance with the present invention.

Referring to FIG. 5, there is illustrated yet another modified form of the present invention wherein the tire is provided with a plurality of grooves 514 in the shoulder portion. This tire is distinguished from that of tire 10 of FIG. 1 in that the grooves 514 do not overlap as do the grooves 14 of FIG. 1. A sufficient number of groove 514 are provided to meet the net to gross limitation in the footprint of the tire.

While applicant has disclosed various embodiments in FIGS. 3, 4 and 5, it will be apparent to those skilled in the art that various changes and modifications can be made without departing from the spirit or scope of the present invention.

I claim:

1. A pneumatic aircraft tire comprising a ground-engaging tread portion having a pair of lateral portions and a plurality of substantially identical arcuate grooves in each of the lateral portions of the tread, each of said arcuate grooves having an axially innermost point from which it extends continuously axially outwardly to the nearest edge of said tread and intersects said edge of the tread in two locations, the circumferential distance between the locations where an arcuate groove intersects a tread edge being no greater than 100% of the tread footprint length, the axially innermost points of the arcuate grooves in one lateral portion of the tread are located on the opposite side of the tire's mid-circumferential centerplane from the axially innermost points of the arcuate grooves in the other lateral portion of the tread and are axially spaced apart from the axially innermost points of the arcuate grooves in said other lateral portion of the tread a distance of between 55% and 75% of the tread width, said tread portion being free of any grooves other than said arcuate grooves, the net-to-gross ratio of said tread as taken from the footprint of the tire being at least 0.90 but not greater than 0.97; said tread comprising an elastomeric material having a 300% modulus of at least 6 MPa, a tensile strength of at least 12 MPa and an elongation of at least 300%.

2. A pneumatic aircraft tire according to claim 1 further characterized in that the elastomeric material forming said tread portion has a hot rebound of at least 60% and a dynamic modulus of at least 5 MPa.

3. A pneumatic aircraft tire according to claim 1 further characterized in that the net to gross of said tread taken from the footprint of the tire is at least 0.95 but not greater than 0.97.

4. A pneumatic aircraft tire according to claim 1 further characterized wherein said grooves in said lateral portions overlap.

5. A pneumatic aircraft tire according to claim 1 further characterized wherein said grooves in said lateral portions overlap.

6. A pneumatic aircraft tire according to claim 2 further characterized wherein said grooves in said lateral portions overlap.

7. A pneumatic aircraft tire according to claim 3 further characterized wherein said grooves in said lateral portions overlap.

* * * * *